(12) United States Patent
Samworth

(10) Patent No.: US 7,102,125 B2
(45) Date of Patent: Sep. 5, 2006

(54) METHOD OF LOGGING A BOREHOLE

(75) Inventor: James Roger Samworth, Ashby de la Zouch (GB)

(73) Assignee: Reeves Wireline Technologies Limited, Leicestershire (GB)

( * ) Notice: Subject to any disclaimer, the term of this patent is extended or adjusted under 35 U.S.C. 154(b) by 277 days.

(21) Appl. No.: 10/661,851

(22) Filed: Sep. 12, 2003

(65) Prior Publication Data

US 2005/0056774 A1    Mar. 17, 2005

(51) Int. Cl.
*G01V 5/10* (2006.01)

(52) U.S. Cl. .............................. 250/269.4; 250/269.6; 250/269.1

(58) Field of Classification Search ............. 250/269.4, 250/269.6, 269.1
See application file for complete search history.

(56) References Cited

U.S. PATENT DOCUMENTS

| | | | | |
|---|---|---|---|---|
| 4,122,338 A | * | 10/1978 | Smith et al. ................. | 250/262 |
| 4,315,148 A | | 2/1982 | Randall | |
| 4,317,034 A | | 2/1982 | Randall | |
| 4,675,145 A | | 6/1987 | Kuswa et al. | |
| 5,128,541 A | * | 7/1992 | Mahdavi et al. ......... | 250/269.5 |
| 6,754,586 B1 | * | 6/2004 | Adolph et al. ................. | 702/8 |
| 2004/0020647 A1 | * | 2/2004 | Snoga ...................... | 166/255.1 |

FOREIGN PATENT DOCUMENTS

| | | |
|---|---|---|
| RU | 2054717 C1 | 2/1996 |
| RU | 2175819 C2 | 11/2001 |

* cited by examiner

*Primary Examiner*—Otilia Gabor
*Assistant Examiner*—Djura Malevic
(74) *Attorney, Agent, or Firm*—Paul and Paul

(57) ABSTRACT

In the field of wellbore data logging it is known to use isotopic neutron sources in a neutron capture logging technique. However, continuous isotopic sources are unpopular for regulatory and safety reasons.

Figure 1:
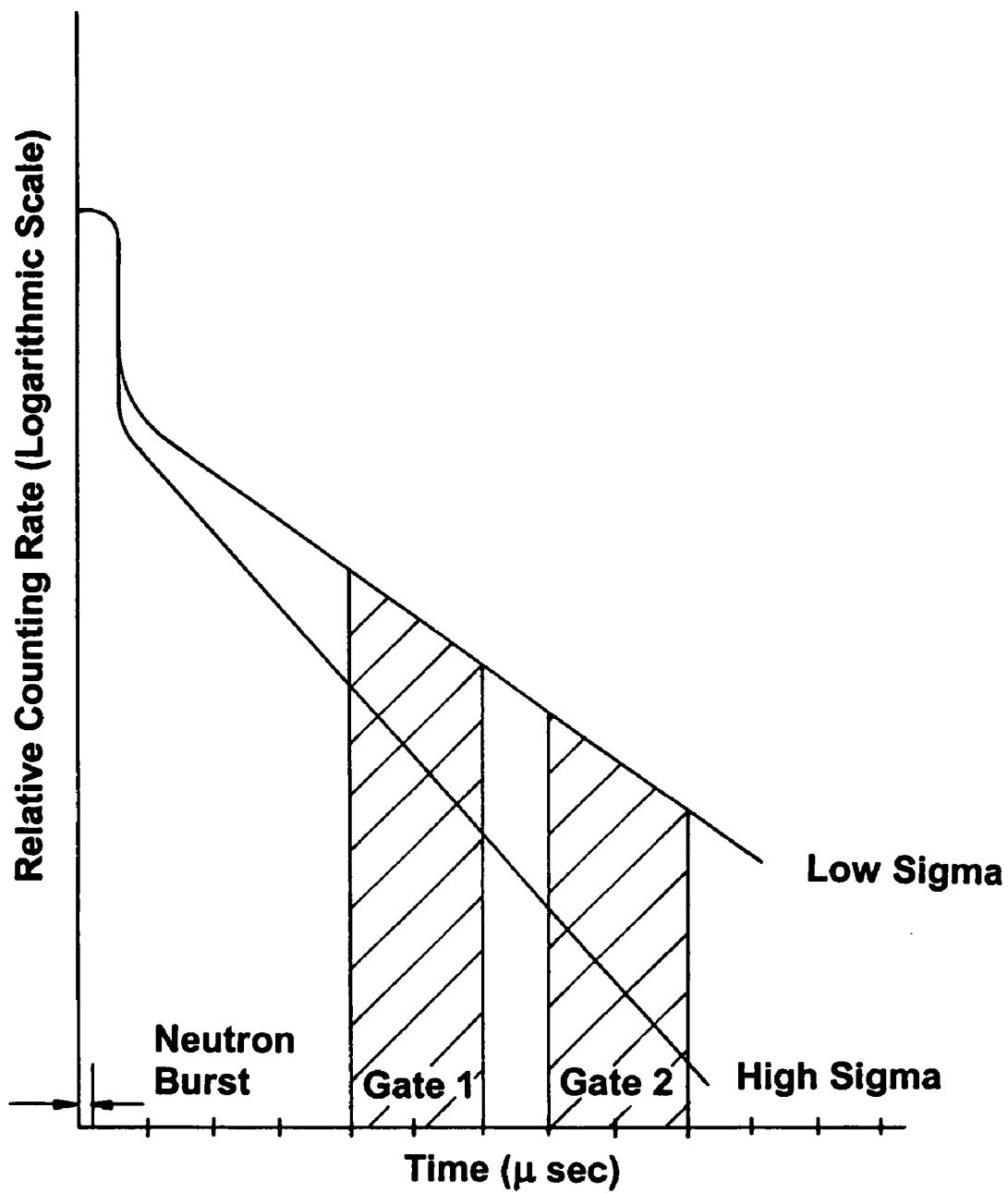

Attempts to employ neutron generator tubes to generate neutron bursts for use in the neutron capture technique have encountered various difficulties in areas connected with signal identification and processing.

The disclosure relates to a method of data logging in which a low burst rate neutron generator tube is pulsed at comparatively low rates to generate neutron bursts that are captured in atomic nuclei in a proximal formation. The gamma radiation arising from the neutron capture is detected over a gating intervals defined by temporally distinct points. The gamma detector output is integrated over the gating interval to provide a measure of the decay rate that is independent of the pulse rate. Consequently the signal processing problems do not arise.

12 Claims, 1 Drawing Sheet

METHOD OF LOGGING A BOREHOLE

This invention relates to a method of logging a borehole.

It is known in the oil and gas industries to log characteristics of a geological formation using an isotopic (continuous) neutron source. Irradiation of a formation with high energy neutrons results in a phenomenon known as neutron capture, in which the neutrons react with atomic nuclei in the formation in a per se known reaction. This reaction generates gamma radiation that is detectable in a borehole in a way that conveys information about the formation and in particular the likelihood of the formation containing hydrocarbons.

Traditionally such logging has involved the use of a continuous neutron source (i.e. a neutron-generating isotope within a container) forming part of a logging tool.

In recent years there has however been a tendency for oil companies to discourage the use of such sources in their boreholes.

This is partly because of legal, insurance and practical problems that arise for example when disposing of the neutron sources at the ends of their service lives.

Also if a logging tool containing a continuous neutron source becomes lost or irretrievably struck in a borehole, it is necessary to entomb the source in the borehole.

This is achieved by pumping concrete into the borehole. Subsequent to the entombing operation it is necessary to drill a new borehole.

These activities are expensive and time-consuming.

It has therefore been proposed to use, in place of a continuous neutron source, a neutron generator tube. One form of such a device employs a vacuum tube containing Deuterium and Tritium gas to generate neutrons. The neutron generator tube operates by using an ion source at one end of the tube to generate Deuterium and Tritium ions that are accelerated by a high voltage potential of the order 100,000 volts on an arrangement of cathodes and anodes towards Deuterium and Tritium ions embedded in a target at the other end of the tube.

The known deuterium-tritium (d-t) reaction then generates neutrons that are emitted isotropically from the target.

Pulsed neutron decay time logging is a technique that employs a pulsed neutron source which is periodically actuated to produce short bursts of neutrons and is quiescent between bursts. During the interval between each pair of successive bursts, the neutrons (as well as the various types of radiation which always result from neutron interactions) die away. The neutron lifetime characteristics of a geological formation surrounding eg. an oil or gas wellbore can therefore be determined by irradiating the formation by means of a neutron burst and then measuring the rate of decay of the residual neutron or gamma radiation that is produced as the neutrons are captured by various nuclei in the rocks.

The radiation intensity is measured using a detector in at least one preselected time interval and, by intercomparing measurements in such time intervals, the rate of neutron die-away can be determined. There exist several mathematical approaches to analysing the count rates so as to generate accurate indications of the rate of neutron die-away. Some of these techniques rely on the measurement of radiation intensity in two or more time intervals.

In any event the measured die-away rate has been shown both by theory and experiment to be a measure of the thermal neutron capture cross section of the medium (ie. the materials in the formation) in which the neutrons are captured. The thermal neutron capture cross-section per unit of volume of formation material is referred to as $\Sigma$. It is related to L, termed the lifetime of neutrons in a material, by the equation $$\Sigma = \frac{3.15}{L}$$

Thermal neutrons are captured mainly by the chlorine present. Hence the tool responds to the amount of salt in the formation water. Hydrocarbons result in longer lifetimes than salt water. A logging tool that utilises the above-outlined pulsed neutron decay principles can be used in cased holes where resistivity logs cannot be run or to monitor reservoir changes to optimize production. The log produced resembles a per se known resistivity log with which it is generally correlatable.

The use of the neutron generator tubes in the logging of subterranean formations surrounding boreholes is in principle preferable to the use of continuous, isotopic sources for the reasons set out above. Nonetheless there are further disadvantages associated with the use of the neutron generator tubes.

Since the neutrons are emitted in bursts so are the detector pulses, causing pulse pile up, difficulty in resolving individual pulses and considerable problems in detector dead time correction if it is required to count the pulses as has been attempted. To alleviate these problems, it is known to cause the emission of the neutrons in many bursts, typically 1000 per second, with fewer numbers of neutrons in each burst.

As the logging progresses, the neutrons cause the logging tool and its contents to become slightly and temporarily radioactive, resulting in an increase in the background radiation seen by the detector, if gamma detection is being employed. This has to be subtracted from the measured signal for correct processing of the decaying detector count rates. With generators operating at the high frequency, the sequence of pulses has to be periodically halted to let the signal decay die away sufficiently for this background to be measured. This is often complex to achieve accurately in a logging tool.

In order to generate such a number of bursts efficiently, it is necessary to employ a dc voltage generator comprising an array of diodes, to cause the 100,000 volt gradient necessary to accelerate the deuterium and tritium ions and so generate neutrons during use of the neutron generator tube. The dc voltage generator is comparatively long. This makes it potentially unsuitable for incorporation into a logging tool intended to pass along a borehole, that may not be straight or parallel-sided.

Voltage gradients of less than 100,000 volts are inefficient, generating few neutrons in the generator tube.

It is however theoretically possible to employ a low burst rate neutron generator that uses a pulsed voltage on the target instead of continuous, dc. The low burst rate generator does not require the dc generator described above and instead employs a (much shorter, cheaper and simpler) voltage induction coil arrangement.

The use of a low burst rate neutron generator however has not proved successful. This is mainly because the neutrons arise in bursts, and hence do the detector pulses causing the previously discussed problems deriving from pulse pile up.

According to a first aspect of the invention there is provided a method of logging a geological formation, comprising the steps of:

(i) pulsing a low burst-rate neutron generator so as to generate a series of neutron bursts that irradiate the formation;

(ii) operating a detector of gamma or neutron radiation, that is so located as to detect gamma or neutron radiation resulting from the capture of neutrons in the formation, to generate a current output that is indicative of gamma or neutron radiation detection; and (iii) integrating the current output of the gamma or neutron radiation detector to generate an analogue waveform that is characteristic of the rate of decay of gamma or neutron radiation, and hence of neutron capture rate.

The step of integrating the detector current over gating periods defined by two or more sampling points ingeniously provides an analogue measure of the decay of the gamma or neutron radiation and hence of the neutron capture in the formation.

Using the method of the invention advantageously there is no need to detect and separate each individual detector pulse.

Since the integration occurs between temporally distinct gating points, and individual pulses are not being counted, the rate at which the neutron generator tube is pulsed is irrelevant to the integrated waveform shape. In other words there is no need to count individual detector pulses and attempt to reference each one to a particular neutron burst. Consequently the step of integrating the gamma or neutron detector output to form the analogue decay waveform renders the use of a low burst rate neutron tube a practical proposition for the first time.

Since the low burst rate generator tube does not require the continuous generation of a 100,000 volt gradient, there is no need for the lengthy and expensive dc generator discussed hereinabove. Consequently the logging tool containing the generator and detector may be made short enough (and cheaply enough) to render it practical for use in oil field and gas field boreholes, even if these contain non-straight, caved in or squeezed portions; or the logging tool is deployed from surface installations that have restricted space.

In practical use of the method of the invention the geological formation would be one adjacent or surrounding a borehole, whereby the steps of the method are carried out using a logging tool. However other modes of carrying out the method, including eg. use of entirely surface-located equipment, may be possible within the scope of the invention.

Conveniently the method includes the further step of:

(iv) converting the analogue waveform resulting from step (iii) to digital form.

Preferably the step (ii) of the method of operating a detector of gamma or neutron radiation, includes sampling the gamma or neutron radiation levels during the gating period.

In practical use of the method the technique would involve summing the detected gamma or neutron levels corresponding to several decays before integrating the summed values to obtain the neutron die-away wave form.

Since the frequency of neutron bursts is not essential to the success of the method, the neutron burst frequency can be chosen to allow each burst to decay fully and to allow time to correct for background radiation build-up.

This is preferably achieved by, immediately before the start of each burst, measuring the background gamma radiation level using the gamma radiation detector.

As a subsequent step, the measured, background gamma level is subtracted from the gamma radiation level detected during the decay waveform interval.

Consequently the known phenomenon, of the neutron bursts causing an increase in the level of background radiation in the formation that perturbs the logged data, is easily accounted for using the method of the invention.

The step of repeatedly measuring the background gamma radiation level also is beneficial in obviating the need for corrections for dc drift in the processing circuitry (such as but not limited to the analogue to digital converter necessary for carrying the a to d conversion) used to carry out the method of the invention.

Preferably the neutron generator is pulsed so as to generate 10–50 neutron bursts per second.

The invention is also considered to reside in the use of a low burst, pulsed target neutron generator, a detector of gamma or neutron radiation and an integrator in a method of logging as defined herein.

Such use also conveniently embraces the use of an analogue to digital converter as specified herein.

Such apparatus preferably is connected as a series of subs in a cylindrical logging tool. Such a tool may be:

A so-called large diameter (eg. greater than 2⅞ inch diameter) cylindrical tool;

A so-called compact diameter tool (eg. a cylindrical tool of less than 2¼ inch diameter).

Either type of tool may be of the wireline or wireless type.

A wireline tool is conveyed from a surface (or other uphole) location to a downhole location, suspended on a wireline. Typically the wireline includes cables for the provision of electrical power to the logging tool; and data cabling for telemetry of data (including log data) to a surface location.

A further variant is for the logging tool to include an on-board memory device, whereby the wireline would omit the telemetry cables.

Yet a further possibility is for the logging tool to be of the battery/memory type, i.e. including both a memory and an on-board power source in the form of a series of batteries.

Such a logging tool need not be suspended on a wireline. Instead it is conveyed to a downhole location by pumping through drilling liquid such as mud.

The use of the low burst rate neutron generator is a significant factor in permitting practising of the method of the invention using a battery/memory type of tool, since the power requirement of such a generator is sufficiently low as to permit the use of an on-board power source.

The following non-limiting description and accompanying figure describe the principles underlying the invention in more detail.

FIG. 1 shows the output of the detector of gamma radiation used in the method of the invention, plotted against time. FIG. 1 includes exemplary curves for both low sigma and high sigma formations, which illustrate the effectiveness of the method of the invention.

It is clear from FIG. 1 that integration at the respective count rate values over the gating intervals indicated by the respective terms "Gate 1" and "Gate 2" following a neutron burst will result in distinctive logs for the high and low sigma formations. The differences between the integrated values are greater following a longer gamma decay period after the neutron burst, as exemplified by the greater differences between the integrated high and low sigma values at Gate 2, than at Gate 1.

The invention claimed is:

1. A method of logging a geological formation, comprising the steps of:
   (i) pulsing a low burst rate neutron generator so as to generate a series of neutron bursts that irradiate the formation;
   (ii) without counting or detecting individual pulses stimulated by a burst from the low burst rate neutron generator, operating a detector of gamma or neutron radiation, that is so located as to detect neutron radiation or gamma radiation generated by the capture of neutrons in the formation to generate a current output that is indicative of gamma radiation detection; and
   (iii) integrating the current output of the gamma radiation detector to generate an analogue waveform that is characteristic of the rate of decay of gamma radiation, and hence of neutron capture rate, during the period of the decay.

2. A logging method according to claim 1 including the further steps of:
   (iv) converting the analogue waveform resulting from step (iii) to digital form.

3. A logging method according to any one of preceding claims 1–2 including the step of:
   (v) repeating the steps (i) and (ii) for a plurality of successive neutron bursts.

4. A logging method according to any one of preceding claims 1–2 wherein the neutron generator is pulsed between approximatejy ten and fifty times per second.

5. A logging method according to any one of preceding claims 1–2 characterised in that the low burst rate neutron generator, the detector of gamma or neutron radiation and the integrator are parts of or secured to a logging tool.

6. A logging method according to any one of preceding claims 1–2 including the steps of:
   (v) measuring the background gamma radiation level before each neutron generator burst occurs.

7. A logging method according to claim 6 including the step of:
   (vi) subtracting each measured background radiation value resulting from step (v) from the gamma radiation level measured by the detector of gamma radiation in the next succeeding burst and decay period.

8. A logging method according to one of the preceding claims 1–2, wherein step (i) uses a pulsed target neutron generator, step (ii) uses a detector of gamma or neutron radiation, and step (iii) uses an integrator.

9. A logging method according to claim 8, wherein step (iv) uses an analogue to digital convertor.

10. A logging method according to any one of the preceding claims 1–2 wherein the step (ii) of operating a detector of gamma or neutron radiation includes sampling the gamma or neutron radiation levels during a gating interval.

11. A logging method according to claim 10 wherein the step (iii) of integrating the detector output current is carried out over gating periods defined by a plurality of sampling points.

12. A logging method according to claim 11 wherein the plurality of sampling pints is limited to two gating intervals.

* * * * *

UNITED STATES PATENT AND TRADEMARK OFFICE
CERTIFICATE OF CORRECTION

PATENT NO.         : 7,102,125 B2                                               Page 1 of 1
APPLICATION NO. : 10/661851
DATED              : September 5, 2006
INVENTOR(S)        : Samworth It is certified that error appears in the above-identified patent and that said Letters Patent is hereby corrected as shown below:

On Title Page,
Please insert the following information in the appropriate location --(30)  Foreign Application Priority Data
   September 13, 2002   UK    0221198.5--

Signed and Sealed this

Twenty-eighth Day of November, 2006

JON W. DUDAS
*Director of the United States Patent and Trademark Office*